United States Patent [19]
Watanabe et al.

[11] Patent Number: 5,295,740
[45] Date of Patent: Mar. 22, 1994

[54] PRESSURE CONTROL DEVICE FOR HYDRAULIC BRAKING SYSTEM

[75] Inventors: Hiroyuki Watanabe; Yuji Oishi; Ishiro Kaneda; Masahiko Hara; Katsunori Shirai, all of Atsugi; Koji Morita, Hiratsuka, all of Japan

[73] Assignees: Atsugi Unisai Corporation; Nissan Motor Co., Ltd., both of Japan

[21] Appl. No.: 880,654

[22] Filed: May 11, 1992

[30] Foreign Application Priority Data

May 14, 1991 [JP] Japan .................. 3-108014

[51] Int. Cl.⁵ .............................................. B60T 8/02
[52] U.S. Cl. ................................ 303/113.2; 303/116.2
[58] Field of Search .............. 303/113.2, 116.1, 116.2, 303/DIG. 1, DIG. 2, DIG. 3, DIG. 4, 900, 901; 180/197; 364/426.02, 426.03

[56] References Cited

U.S. PATENT DOCUMENTS

| | | | |
|---|---|---|---|
| 4,597,330 | 9/1990 | Morikawa et al. | 303/900 X |
| 4,872,370 | 10/1989 | Takagi et al. | 303/116.2 X |
| 5,058,961 | 10/1991 | Mergenthaler et al. | 303/116.2 X |
| 5,131,730 | 7/1992 | Kollers et al. | 303/116.2 X |
| 5,165,764 | 11/1992 | Miyake et al. | 303/116.2 X |
| 5,169,214 | 12/1992 | Holzmann et al. | 303/116.1 X |

FOREIGN PATENT DOCUMENTS

| | | |
|---|---|---|
| 4024596 | 2/1991 | Fed. Rep. of Germany . |
| 4017873 | 12/1991 | Fed. Rep. of Germany . |
| 58-122246 | 9/1982 | Japan . |
| 3-045449 | 2/1991 | Japan ................. 303/113.2 |
| 2218479 | 11/1989 | United Kingdom ............. 303/116.2 |

Primary Examiner—Robert J. Oberleitner
Assistant Examiner—Peter M. Poon
Attorney, Agent, or Firm—Lowe, Price, LeBlanc & Becker

[57] ABSTRACT

A pressure control device for a hydraulic braking system of an automotive vehicle is provided with a master cylinder for pressurizing hydraulic fluid according to a braking action of a driver. A wheel cylinder for applying braking force to a wheel is communicated with the master cylinder through a main passage. An accumulator is connected to the main passage. A rotating condition of the wheel is detected by a detector and is outputted as a signal indicative of the rotating condition of the wheel. A hydraulic pressure controller is arranged to control the wheel cylinder hydraulic pressure when the detector detects one of a lock condition and a slippage condition. The hydraulic pressure controller is communicated with the main passage. A switching device is arranged to stop the communication between the master cylinder and the hydraulic pressure controller, and open the communication between the accumulator and the hydraulic pressure controller when the detector detects the slippage condition in acceleration. Therefore, during the slippage control in acceleration, the hydraulic fluid stored in the hydraulic pressure controller is returned to the main passage owing to the pressure difference therebetween.

7 Claims, 17 Drawing Sheets

PRESSURE CONTROL DEVICE FOR HYDRAULIC BRAKING SYSTEM

BACKGROUND OF THE INVENTION

1. Field of the Invention

The present invention relates to improvements in a pressure control device for hydraulic braking system of an automotive vehicle, and more particularly to a hydraulic pressure control device for an anti-lock braking control and a slippage control in acceleration.

2. Description of the Prior Art

Japanese Patent Provisional Publication No. 58-122246 discloses a typical pressure control device applied to a hydraulic braking system which carries out the anti-lock braking control and the slippage control in acceleration. This device includes a pressure control valve which is disposed to a main passage communicating a master cylinder and a wheel cylinder in order to control a hydraulic pressure of the wheel cylinder. For carrying out the anti-lock braking control, the hydraulic fluid in the wheel cylinder is lowered in pressure by draining it to a storage chamber through the pressure control valve, and is fed to the main passage between the pressure control valve and pressure source switching valve. During the slippage in acceleration, in order to suppress the slippage of the wheels, this system operates to temporarily store a hydraulic pressure in the storage chamber through a supply pump, to stop the communication between the master cylinder and the pressure control valve, and to communicate the accumulator and the pressure control valve for supplying the hydraulic pressure of the accumulator to the wheel cylinder.

However, the conventional pressure control device performs to operate the return pump even during the slippage control in acceleration. This operation of the return pump generates noises which make passengers uncomfortable.

SUMMARY OF THE INVENTION

It is an object of the present invention to provide an improved hydraulic pressure control device which is free of the above-mentioned drawbacks.

A pressure control device for a hydraulic braking system according to the present invention is for an automotive vehicle. The pressure control device comprises a first hydraulic pressure source which pressurizes hydraulic fluid according to a braking action of a driver. A main passage communicates the first hydraulic pressure source and a wheel cylinder through which braking force is applied to a wheel of the automotive vehicle. A second hydraulic pressure source is connected to the main passage. A detecting means detects a wheel rotating condition and outputs a signal indicative of the rotating condition of the wheel. A hydraulic pressure control means controls hydraulic pressure of said wheel cylinder when the detecting means detecting one of a lock condition and a slippage condition. A switching means switches a communicating state between the hydraulic pressure controlling means and the first and second hydraulic pressure sources. The switching mean stops the communication between the first hydraulic pressure source and the hydraulic pressure controlling means, and opens the communication between the second hydraulic pressure source and the hydraulic pressure controlling means when the detecting means detects the slippage condition in acceleration. A first return passage communicates with the hydraulic pressure control means and the main passage.

With this arrangement, during the slippage control in acceleration, a return pump of the hydraulic pressure control means is not operated since the hydraulic fluid in a storage chamber of the hydraulic pressure control means is rapidly returned to the main passage by utilizing a pressure difference between the storage chamber and the main passage. This improves the comfort for passengers of a vehicle and durability of the return pump.

BRIEF DESCRIPTION OF THE DRAWINGS

In the drawings, like reference numerals designate like parts and elements throughout all figures, in which.

DETAILED DESCRIPTION OF THE INVENTION

Figure 1:
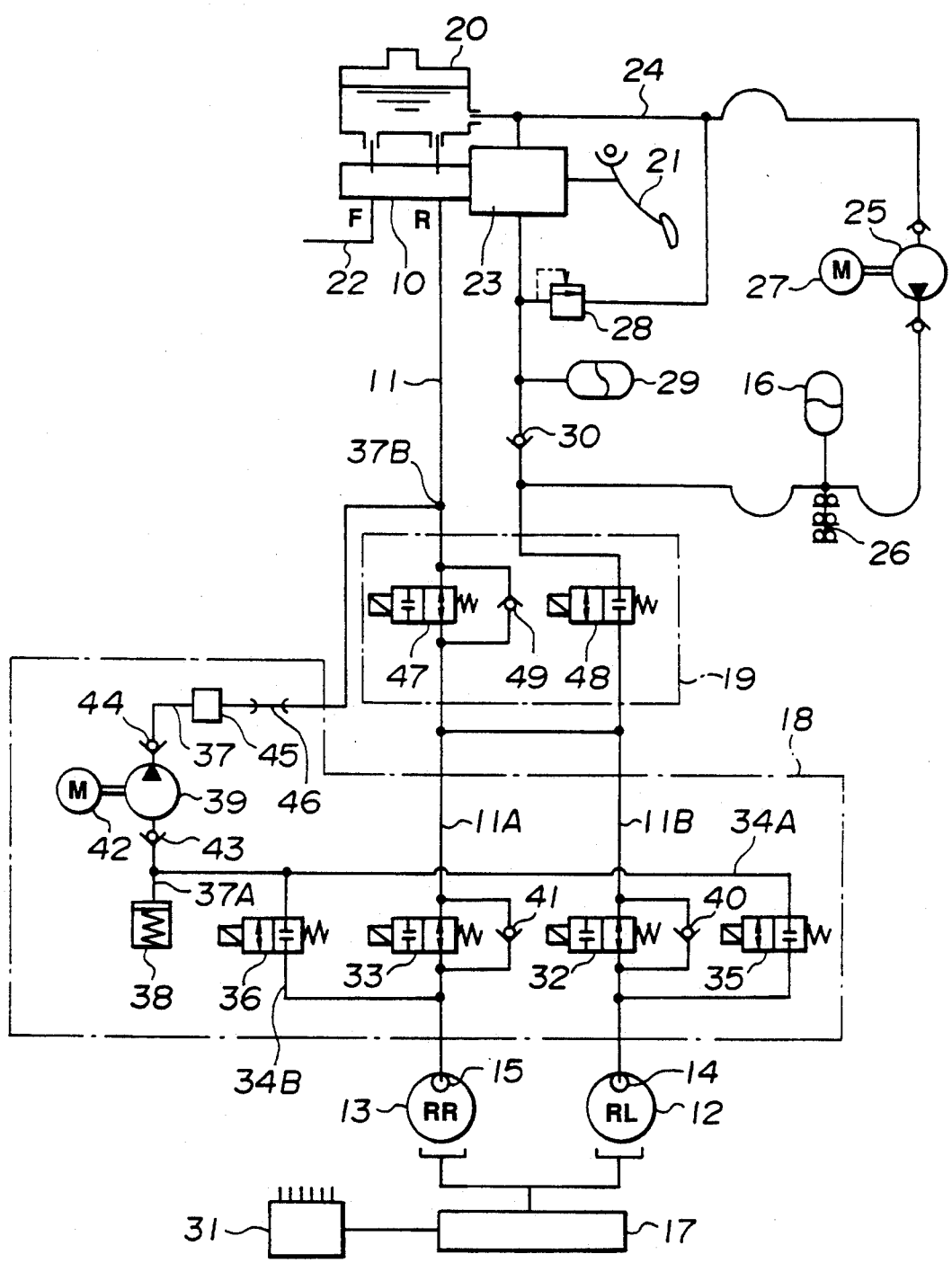
FIG. 1 is a schematic block diagram of a first embodiment of a control device of a brake hydraulic pressure according to the present invention.

Referring now to FIG. 1, there is shown a first embodiment of a pressure control device for a hydraulic braking system of an automotive vehicle according to the present invention. The pressure control device is applied to a rear axle which is of a drive axle and comprises a master cylinder 10 serving as a first hydraulic pressure source. The master cylinder 10 is communicated through a first (main) passage 11 with wheel cylinders 14 and 15 of rear wheels 12 and 13, respectively. An accumulator 16 serving as a second hydraulic pressure source is disposed on the way of the first passage 11. A wheel speed sensor 17 is arranged to detect the irregular state of the rear wheels 12 and 13, such as a locking or slipping state. The wheel speed sensor 17 generates a signal in response to the detection of the locking or slipping and outputs the signal indicative of such a rotating condition of the rear wheels 12 and 13 to a controller 31. A hydraulic pressure control means 18 for adjusting a hydraulic pressure of the wheel cylinders 14 and 15 is installed to the first passage 11. A pressure source switching means 19 for changing a hydraulic connecting state of the hydraulic pressure control means 18 and accumulator 16 is installed to the first passage 11 between the master cylinder 10 and the brake hydraulic pressure control means 18.

The master cylinder 10 includes first and second pressure chambers (though not shown), and a reservoir 20 for storing the brake fluid therein, so that the a hydraulic pressure is generated in response to the depression degree of the brake pedal 21. The first pressure chamber is communicated with the wheel cylinders 14 and 15 through first and second branches 11A and 11B branched from the first passage 11 at the downstream side. The second pressure chamber is communicated with wheel cylinders (not shown) of front wheels. The master cylinder 10 includes a pressure booster 23 for easily operating the braking action by a driver.

The accumulator 16 is communicated with a bypass passage 24 connected to the reservoir 20 and operates to store a hydraulic pressure supplied from a pump 25 disposed at an upstream side of the bypass passage 24. A pressure switch 26 is arranged to detect the pressure in the accumulator 16. A motor 27 driving the pump 25 is stopped when the pressure in the accumulator 16 is higher than a predetermined value, and is operated when lower than the predetermined value. The bypass passage 24 is provided with a relief valve 28 which controls the pressure in the bypass passage 24 at a predetermined value. An accumulator 29 for supplying hydraulic pressure to the booster 23 is installed to the bypass passage 24. The downstream end of the bypass passage 24 is connected to the branches 11A and 11B through the hydraulic pressure source switching means 19. A check valve 30 is disposed in the bypass passage 24 between the accumulator 29 and the hydraulic pressure source switching means 19 so as to allow the fluid in the accumulator 29 to flow only to the branches 11A and 11B. The wheel speed sensor 17 is arranged to detect the rotation speed of the rear wheels 12 and 13 and to output the signal indicative of the wheel rotation speed to a controller 31.

The brake hydraulic pressure control means 18 includes a first and second inlet valves 32 and 33 which are of a 2-port and 2-position type and of a normally open type. The first and second inlet valves 32 and 33 are disposed to the branches 11A and 11B respectively. First and second outlet valves 35 and 36, which are of a 2-port and 2-position type and of a normally close type, are connected respectively to drain passages 34A and 34B which is branched from the downstream side of the inlet valves 32 and 33. The conjunction of the drain passages 34A and 34B is connected to a return passage 37. A storage chamber 38 is connected to the wheel cylinders 14 and 15 through the drain passages 34A and 34B so as to store the hydraulic fluid drained from the wheel cylinders 14 and 15 therein. The hydraulic fluid stored in the storage chamber 38 is drained to the first passage 11 by a return pump 39.

The first and second inlet valves 32 and 33, and the first and second outlet valves 35 and 36 are electrically connected to the controller 31 so as to be controlled according to the output signals from the controller 31. One way valves 40 and 41 are disposed in parallel to the first and second inlet valves 32 and 33, respectively, in order to prevent the hydraulic fluid from flowing from the branches 11A and 11B to the wheel cylinders 14 and 15. The return passage 37 is connected at its upstream end 37a to the storage chamber 38 and connected at its downstream end 37B to the upstream side of the first passage 11 from the hydraulic pressure source switching means 19. The return pump 39 of a plunger type is driven by a motor 42 and controlled at on or off state according to the signal from the controller 31. One way valves 43 and 44 are disposed to the inlet and outlet of the return pump 39, respectively, so as to allow the fluid to flow only from the storage chamber 38 to the first passage 11. A dumper 45 and an orifice 46 are disposed in series in the vicinity of the downstream end 37B to suppress the pulsation of the fluid fed from the pump 39.

The hydraulic pressure source switching means 19 includes a first valve 47 which is of a 2-port and 2-position type and a normally open type, and a second valve 48 which is of a 2-port and 2-position type and of a normally close type. The first valve 47 is disposed to the first passage 11 downstream of the downstream end 37B of the return passage 37. The second valve 48 is disposed to the bypass passage 24 downstream of the accumulator 16. The first and second valves 47 and 48 are controlled according to the signals from the controller 31 so that the first passage 11 and the bypass passage 24 are set at one of an open state or close state. A one way valve 49 is disposed in a bypass passage of the first valve 47 to prevent the hydraulic fluid from flowing into the first passage 11.

Figure 2:
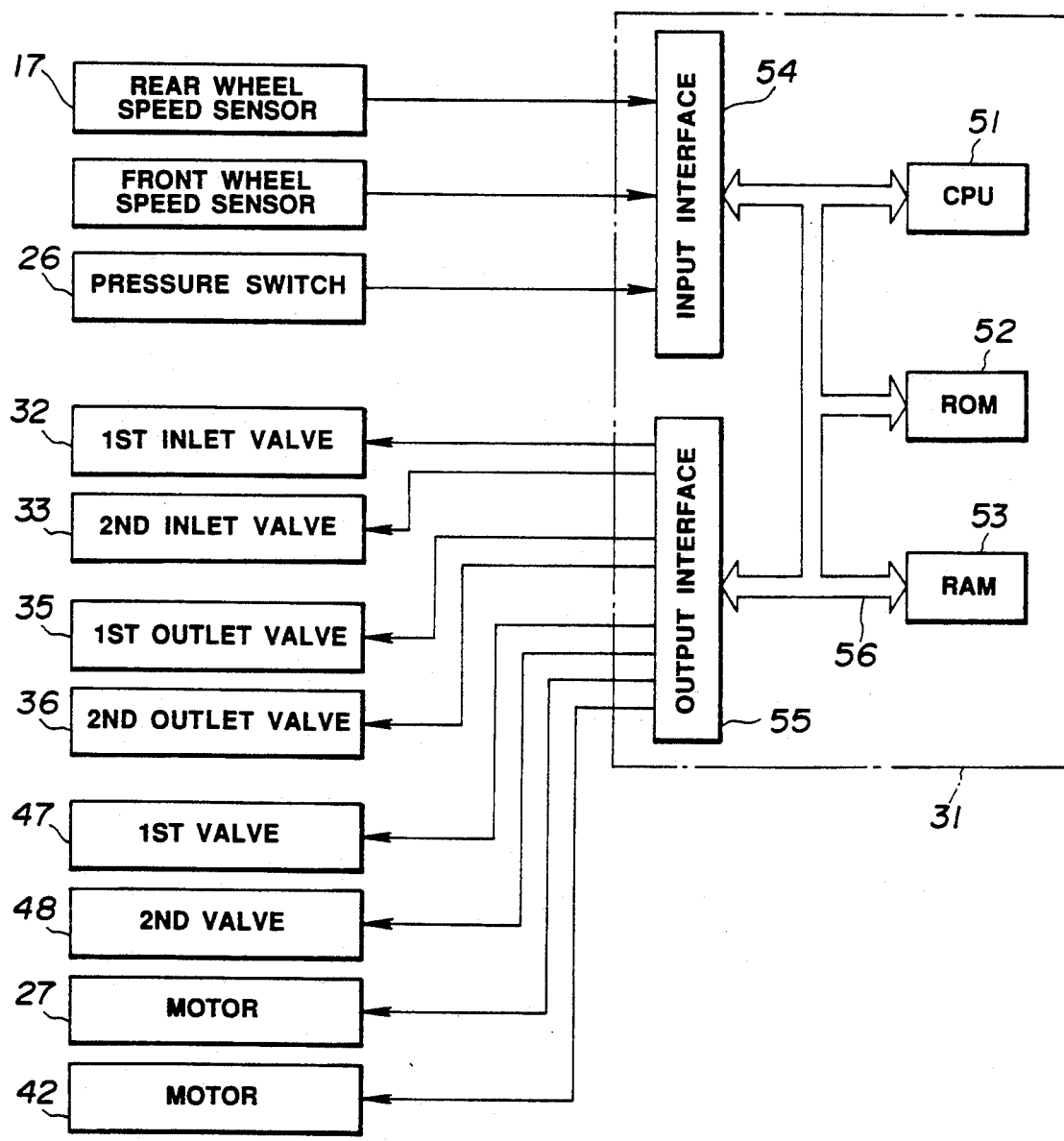
FIG. 2 is a block diagram showing a controller applied to the first embodiment of FIG. 1.

As shown in FIG. 2, the controller 31 is of a microcomputer based unit which includes an input port 54, an output port 55, a data bus 56, a central processor unit (CPU) 51, a read only memory (ROM) 52 and a random access memory (RAM) 53. The signals detected by the wheel speed sensor 17 and the pressure switch 26 are fed to the controller 31 and processed according to the program previously installed in the controller 31. On the basis of the detected signals, the CPU 51 processes the program for controlling driving the first and second inlet valves 32 and 33, the first and second outlet valves 35 and 36, the first and second valves 47 and 48 and the motors 27 and 42. In the controller 31, the ROM 52 previously stores the control program and a base data. The RAM 53 temporarily stores a data for the sensors 17 and 26, and data required to the precessing for the calculation and the like. The input interface 54 includes a multiplexor for selectively feeding the signals of the sensors to the CPU 51. The output interface 55 includes a drive circuit for driving the valves 32, 33 and the like according to the signals from the CPU 51. Every components of the controller 31 are communicated with each other through the data bas 56.

The manner of operation of the thus arranged control device will be discussed hereinafter.

(1) During the Normal Braking

When the braking operation is carried out without the anti-lock control or high-speed slipping control, the first and second inlet valves 32 and 33 are set to be opened and the first and second outlet valves 35 and 36 are set to be closed. Additionally, the first valve 47 is opened and the second valve 48 is closed. Therefore, the master cylinder 10 is communicated with the wheel cylinders 14 and 15 of the rear wheels 12 and 13. The accumulator 16 is incommunicative with the master cylinder 10 to be independent from others.

Accordingly, due to the depression of the brake pedal, the hydraulic pressure of the first hydraulic pressure generating chamber (no numeral) of the master cylinder 10 is applied to the wheel cylinders 14 and 15 through the first passage 11 and the branches 11A and 11B. The hydraulic pressure of the second hydraulic pressure generating chamber (no numeral) is applied to the wheel cylinders of the front wheels.

(2) During the Anti-Lock Control

The anti-lock control is carried out to the front right wheel, the front left wheel and the rear wheels, respectively. The manner of operation of the anti-lock control for the rear wheels will be discussed hereinafter as a typical case, since the manner of the anti-lock control to each wheel is similar to others.

During the depression of the brake pedal 21, if it is judged that it is necessary to carry out the anti-lock control as a result of the judgement of the controller 31 on the basis of the signal from the wheel speed sensor 17, the controller outputs signals to set the first valve 47 in an open state, to set the second valve 48 in a closed state, to set the first and second inlet valves 32 and 33 in a closed state, and to set the first and second outlet valves 35 and 36 at an opened state. Accordingly, the hydraulic fluid of the wheel cylinders 14 and 15 is drained to the storage chamber 38 in order to reduce the hydraulic pressure in the wheel cylinders 14 and 15.

In order to keep on the hydraulic pressure of the wheel cylinders 14 and 15, the first and second inlet valves 32 and 33 are closed, and the first and second outlet valves 35 and 36 are also closed, according to the command of the controller 31. In order to again raise the hydraulic pressure of the wheel cylinder 14 and 15, the controller 31 outputs the signals to drive the motor 42 to suck the brake fluid stored in the storage chamber 38 and to return the brake fluid to the first passage 11 through the return passage 37 while applying the pressure to the brake fluid. Then, the first valve 47 and the first inlet valve 32 and 33 are set at an open state.

With the repeat of the keeping and the raising operations of the hydraulic pressure of the wheel cylinders 14 and 15, the anti-lock control is carried out. During the anti-lock control, the first and second valves 47 and 48 are set at an open state (off state).

(3) During the Slippage Control in Acceleration

Figure 3:
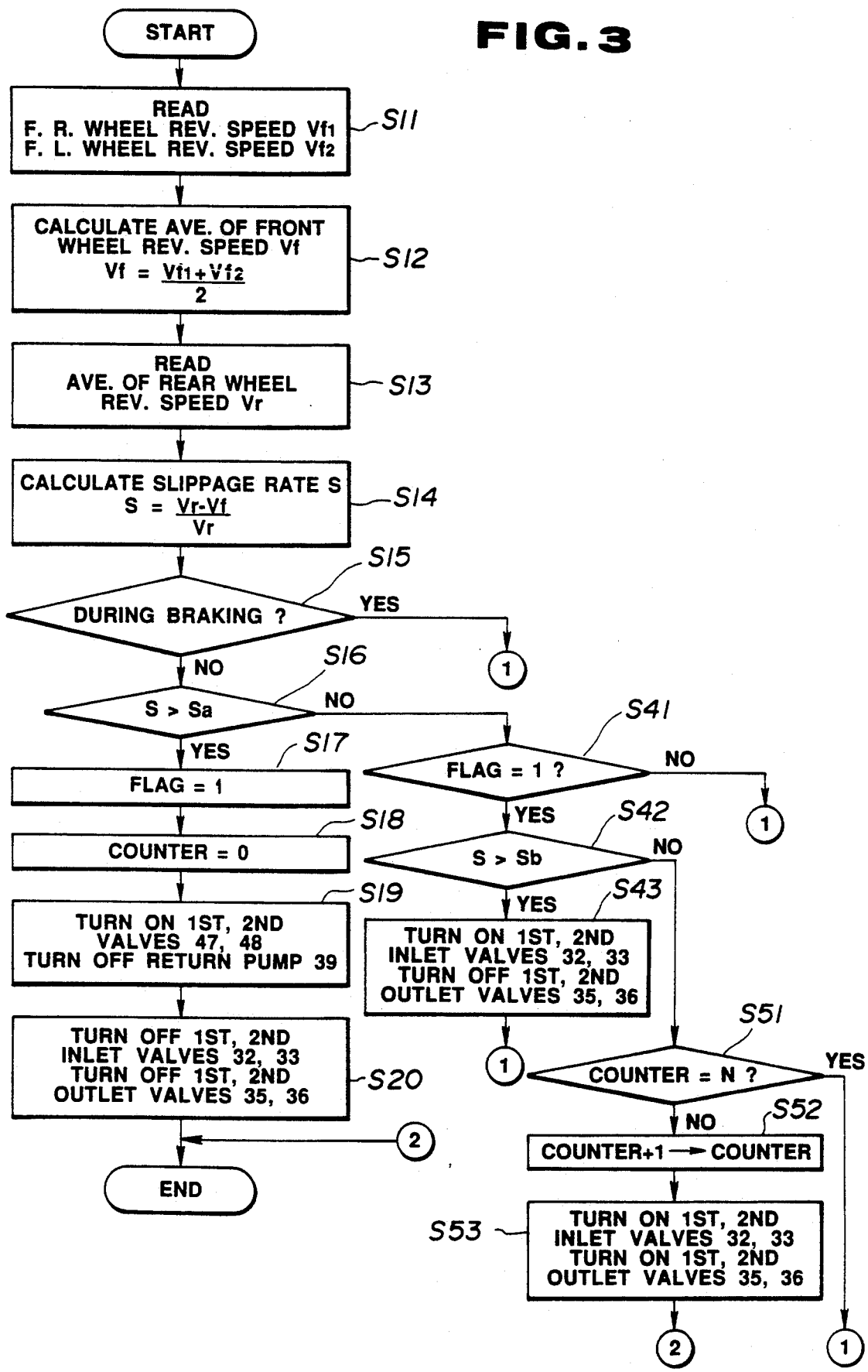
FIG. 3 is a flow-chart showing a control procedure of the first embodiment of FIG. 1.

With reference to the flow-charts of FIGS. 3 to 5, the manner of a first embodiment of the slippage control during the acceleration will be discussed.

The operation of the flow-chart is carried out as a handling interruption operation at predetermined intervals such as every 5 mscc. At a step S11, a F. R. (Front and Right) wheel revolution speed Vf1 and a F. L. (Front and Left) wheel revolution speed Vf2 are read in from the wheel speed sensor.

At a step S12, an average revolution speed Vf of front wheels are calculated according to the following equation:

$$Vf = \frac{Vf1 + Vf2}{2}$$

Following this, at a step S13, an average revolution speed Vr of rear wheels are read in the controller 31 from the wheel speed sensor 17. At a step S14, a slippage rate S is calculated according to the following equation:

$$S = \frac{Vr - Vf}{Vr}$$

At a step S15, it is judged from the signal from the pedal switch whether it is in braking or not. When it is in braking, the program proceeds to a step S31 wherein a flag is set to 0 (flag=0). Following this, at a step S32, a counter is cleared to 0 (counter=0). At a step S33 the valves 47 and 48, and the supply pump 25 are turned off, that is, the system is set at a condition applicable to the normal braking. Further, the program proceeds to a step S34 wherein the first and second inlet valves 32 and 33, and the first and second outlet valves 35 and 36 are turned off. That is to say, the master cylinder 10 is communicated with the wheel cylinders 14 and 15.

When it is judged at the step S15 that it is not in braking, the program proceeds to a step S16 wherein it is judged whether or not the slippage rate S is greater than an upper limit Sa which is previously determined. When S>Sa, it is judged that a relatively large slippage in acceleration is occurring. Accordingly, at a step S17, the flag is set at 1 (flag=1) and at a step S18 the counter 18 is cleared (counter=0). At a step S19, the valves 47 and 48 are turned on, and the return pump 39 is turned off. Following this, at a step S20, the first and second inlet valves 32 and 33, and the first and second outlet valves 35 and 36 are turned off so as to communicate the accumulator 16 and the wheel cylinders 14 and 15 for the purpose of the raising of the hydraulic pressure of the wheel cylinders 14 and 15.

The pressurized hydraulic fluid in the storage chamber 38 discharged into the first passage 11 through the return passage 37 and the return pump 39 since the first passage 11 is set at a generally atmospheric pressure due to the absence of the depression of the brake pedal. The discharged fluid is used for raising the hydraulic pressure of the wheel cylinders 14 and 15, or for raising the hydraulic pressure in the accumulator 16 through the return pump 25 upon being returned to the reservoir 20. The excess amount of the hydraulic fluid for raising the hydraulic pressure in the accumulator 16 is returned to the reservoir 20 through the relief valve 28.

When the judgement at the step S16 is "NO" (S<Sa), the program proceeds to a step S41 wherein it is judged whether the flag is set to 1 or not. When the flag is 1 (flag=1), the program proceeds to a step S42 wherein it is judged whether or not the slippage rate S is lower than a lower limit Sb which is previously determined. When S>Sb, the program proceeds to a step S43 wherein the first and second inlet valves 32 and 33 are turned on, and the first and second outlet valves 35 and 36 are turned off. With this control, the hydraulic pressure of the wheel cylinders 14 and 15 is set so that the driving force of the wheels takes a maximum value and that the slippage rate S is kept in a predetermined range.

When the judgement at the step S42 is "NO" (S≦Sb), the program proceeds to a step S51 wherein it is judged whether the counter is counted up to a predetermined value N or not. When the counter is yet counted up to the predetermined value N (counter<N), the program proceeds to a step S52 wherein the counter is incremented by 1 (counter=counter+1). At a step S53, the first and second inlet valves 32 and 33, and the first and second outlet valves 35 and 36 are turned on. Accordingly, the hydraulic fluid in the wheel cylinders 14 and 15 are returned to the storage chamber 38 so as to reduce the hydraulic pressure in wheel cylinders 14 and 15. Then, the hydraulic fluid in the storage chamber 38 is drained to the first passage 11 through the return passage 37 since the return pump 39 has been set at an inoperative state.

Figure 4:
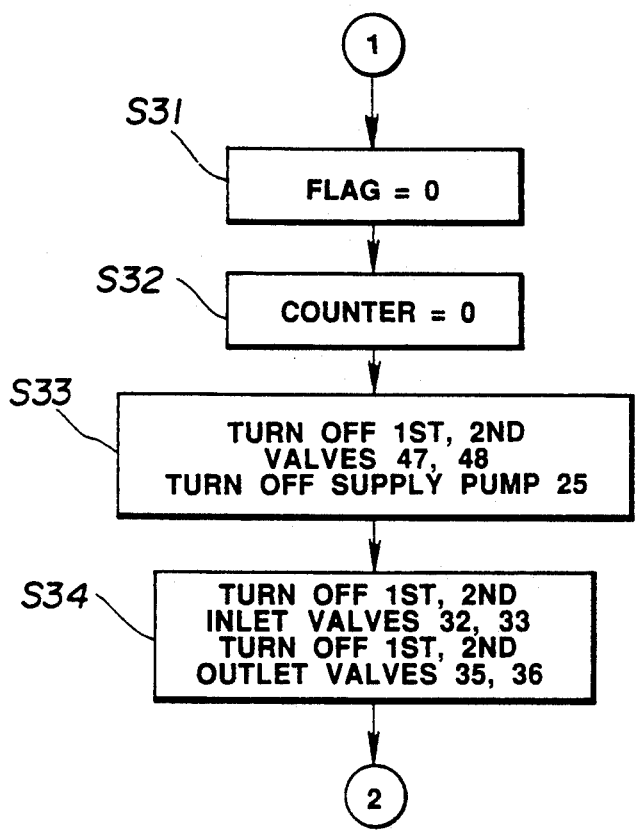
FIG. 4 is a flow-chart showing a control procedure concerned to the flow-chart of FIG. 3.

When at the step S51 the counter is set at N, that is, when it is judged that the hydraulic pressure in the wheel cylinders 14 and 15 is sufficiently reduced and it is not in the slippage condition in the acceleration, the program proceeds to a step S31 of the controlling program shown in FIG. 4.

On the other hand, when at the step S41 the flag is not "1" (flag≠1), the program proceeds to the step S31 so that the brake can be normally operated.

Figure 5:
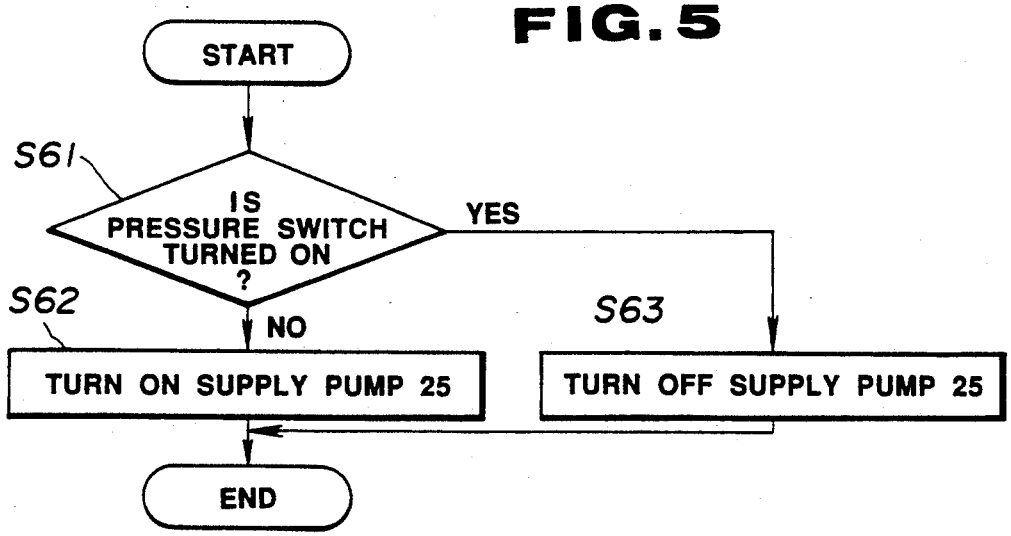
FIG. 5 is a flow-chart showing a pressure accumulating control concerned to the flow-chart of FIG. 3.

The pressure accumulating control to the accumulator 16 is carried by the program of FIG. 5. At a step S61, it is judged whether the pressure switch 26 is in on condition or not. When the pressure switch 26 is in off condition, the program proceeds to a step S62 wherein the supply pump 25 is turned on to store the hydraulic pressure in the accumulator 16. When the pressure switch is in ON state, the program proceeds to a step S63 wherein the supply pump 25 is turned off. The pressure accumulating control is carried out even during the normal braking, the anti-lock controlling, or the slippage control in acceleration.

Since the above-mentioned embodiment is arranged so that the pressurized hydraulic fluid in the storage chamber 38 can be returned to the first passage 11 through the returned passage 37 during the slippage control in acceleration, it is possible to set the return pump 39 in the inoperative state. This prevents the generation of noise of the return pump 39 and the like, and improves a durability of the return pump 39.

The hydraulic fluid returned to the first passage 11 during the anti-lock control is reduced in its pulsation by passing through a damping chamber 45 and the orifice 46. Accordingly, the kick-back action from the brake pedal 21 is prevented during the step-down operation of the brake pedal 21

Figure 6:
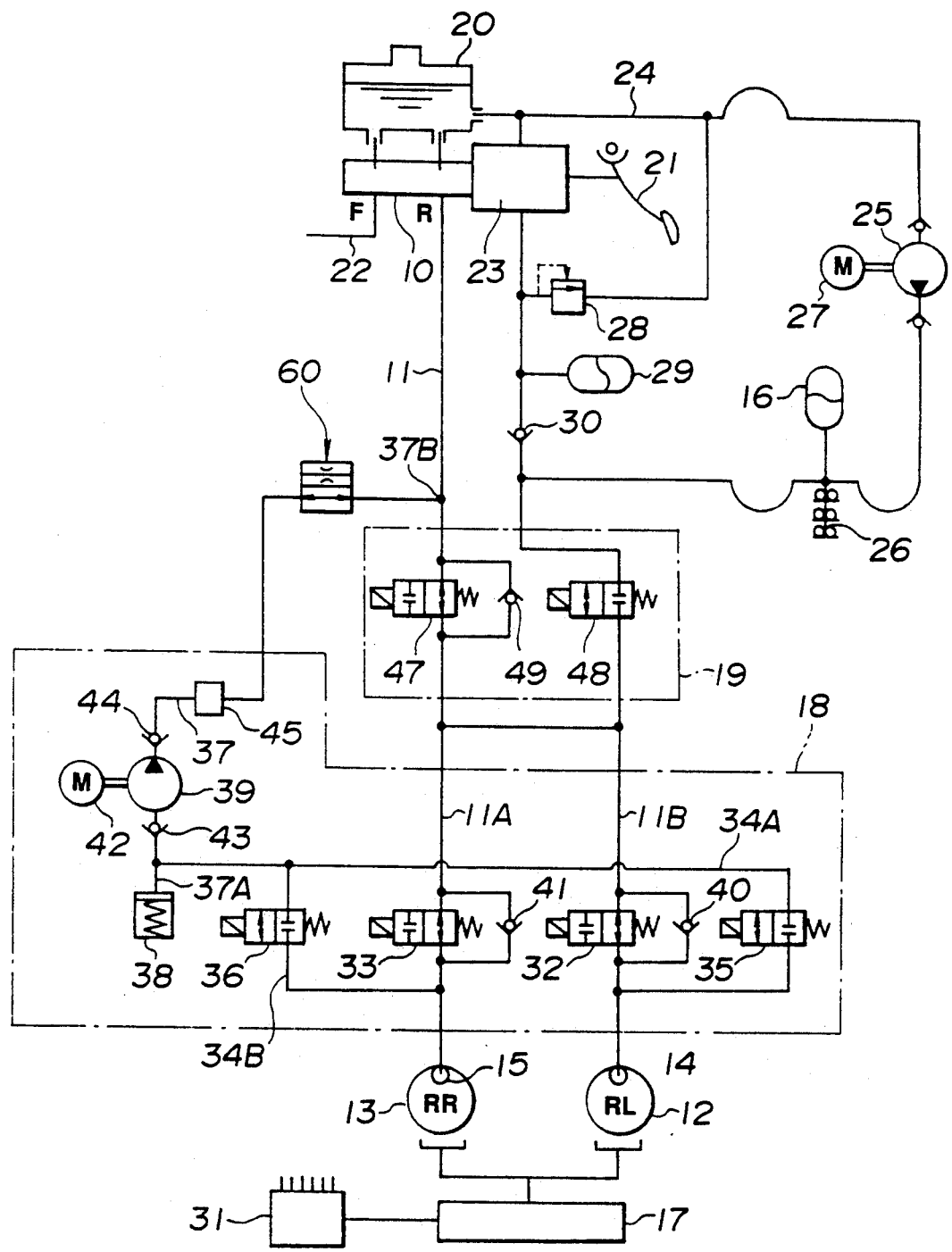
FIG. 6 is a schematic block diagram of a second embodiment of the control device of brake hydraulic pressure according to the present invention.
Figure 7:
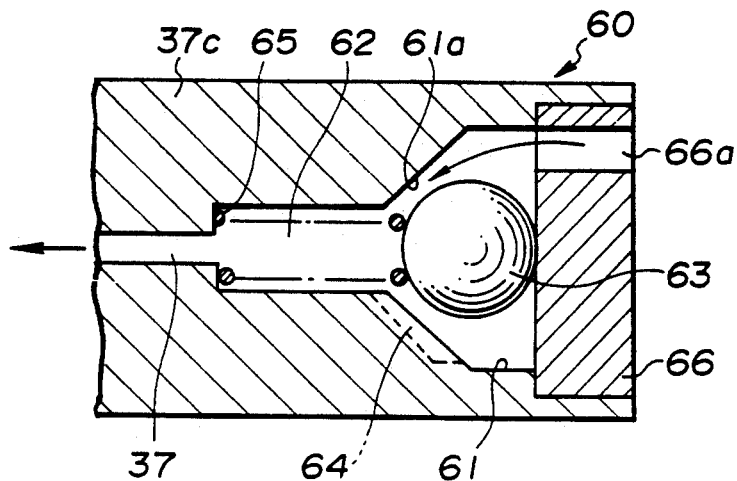
FIG. 7 is an enlarged cross-sectional view of a valve mechanism of the second embodiment of FIG. 6.
Figure 8:
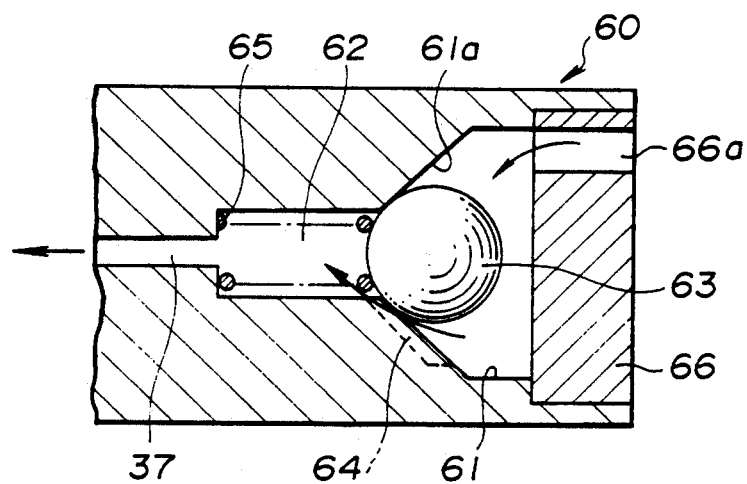
FIG. 8 is an enlarged cross-sectional view of a valve mechanism which is the same as that of FIG. 7 but shows another control state of FIG. 7.

Referring to FIG. 6, there is shown a second embodiment of an apparatus for controlling a brake hydraulic pressure according to the present invention. The second embodiment is similar to the first embodiment except that a flow control mechanism instead of the orifice 46 is disposed in the middle of the return passage 37. The flow control mechanism 60 is in the passage wall 37c in which a valve hole 61 of a large diameter and a passage portion 62 of a middle diameter communicates the valve hole 61 and the return passage 37 as shown in FIG. 7. The tip end portion of the valve hole 61 is formed conical shaped and a ball valve 63 is disposed therein. A portion of the conical surface 61a of the valve hole 61 has an orifice 64 by forming a groove extending to the passage portion 62. The cross-section area of the valve hole 61 is varied by changing the distance between the conical surface 61a and the ball valve 63. A spring 65 is arranged in the passage portion 62 to push the ball valve to an opened portion. (A stopper plate 66 having a through-hole 66a is fixedly disposed to the other end portion of the valve hole 61.)

With this arrangement, the return pump 39 is set in an inoperative state during the slippage control in acceleration. Accordingly, the hydraulic fluid in the storage chamber 38 is automatically returned to the first passage 11 through the return passage 37. Therefore, the returned hydraulic fluid is lowered in flow rate by passing through the passage hole 66a, and the ball valve 63 is pushed by the spring 65 until be in contact with stopper plate 66. Accordingly, the hydraulic fluid is rapidly returned to the first passage 11. This improves the reduction speed of the hydraulic pressure in the wheel cylinders 14 and 15.

On the other hands, during the anti-lock control, the return pump 39 is in operation. Accordingly, the flow rate of the returned hydraulic fluid is increased. This functions to fit the ball valve 63 with the conical surface 61a against the biasing force of the spring 65. Therefore, the hydraulic fluid flows through the orifice 64 to the first passage 11. This decreasing of the flow rate by the orifice 64 sufficiently damps the pulsation of the fluid flow and prevents the generation of the kick back during the step-down of the brake pedal 21.

Figure 9:
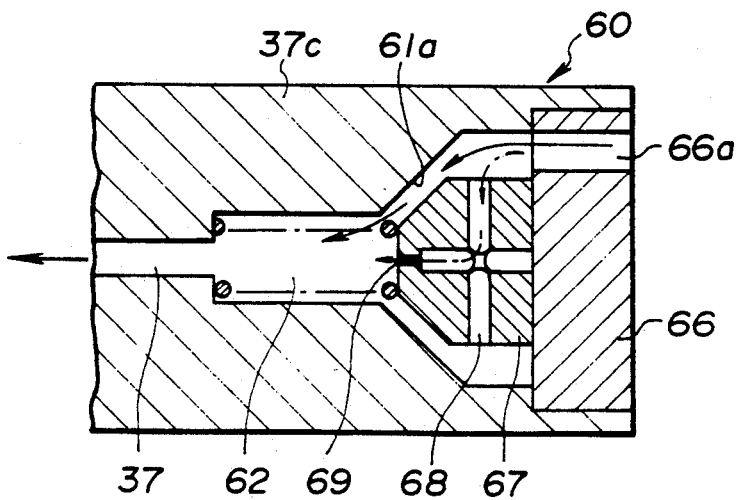
FIG. 9 is an enlarged cross-sectional view of another valve mechanism of the second embodiment of FIG. 6.

FIG. 9 shows the flow control mechanism similar to that of FIG. 7 except that a corn shaped valve 67 is used instead of the the ball valve 63. A cross-shaped passage 68 is formed inside of the corn-shaped valve 67 as shown in FIG. 9. A tip end portion of the cross-shaped passage 68 has an orifice 69 through which the hydraulic fluid is flowed even if the corn-shaped valve 67 is contacted with the conical surface 61a. With this flow control mechanism, the corn-shaped valve 67 is opened during the slippage control in acceleration to rapidly flow the hydraulic fluid. During the anti-lock control, the corn-shaped valve 67 is in contact with the conical surface 61a so that the hydraulic fluid flows through the orifice 69 to the passage portion 62. This damps the pulsation of the hydraulic fluid. Furthermore, the passage 68 and the orifice 69 of the valve mechanism of FIG. 9 can be easily manufactured as compared with those of the first embodiment.

Figure 10:
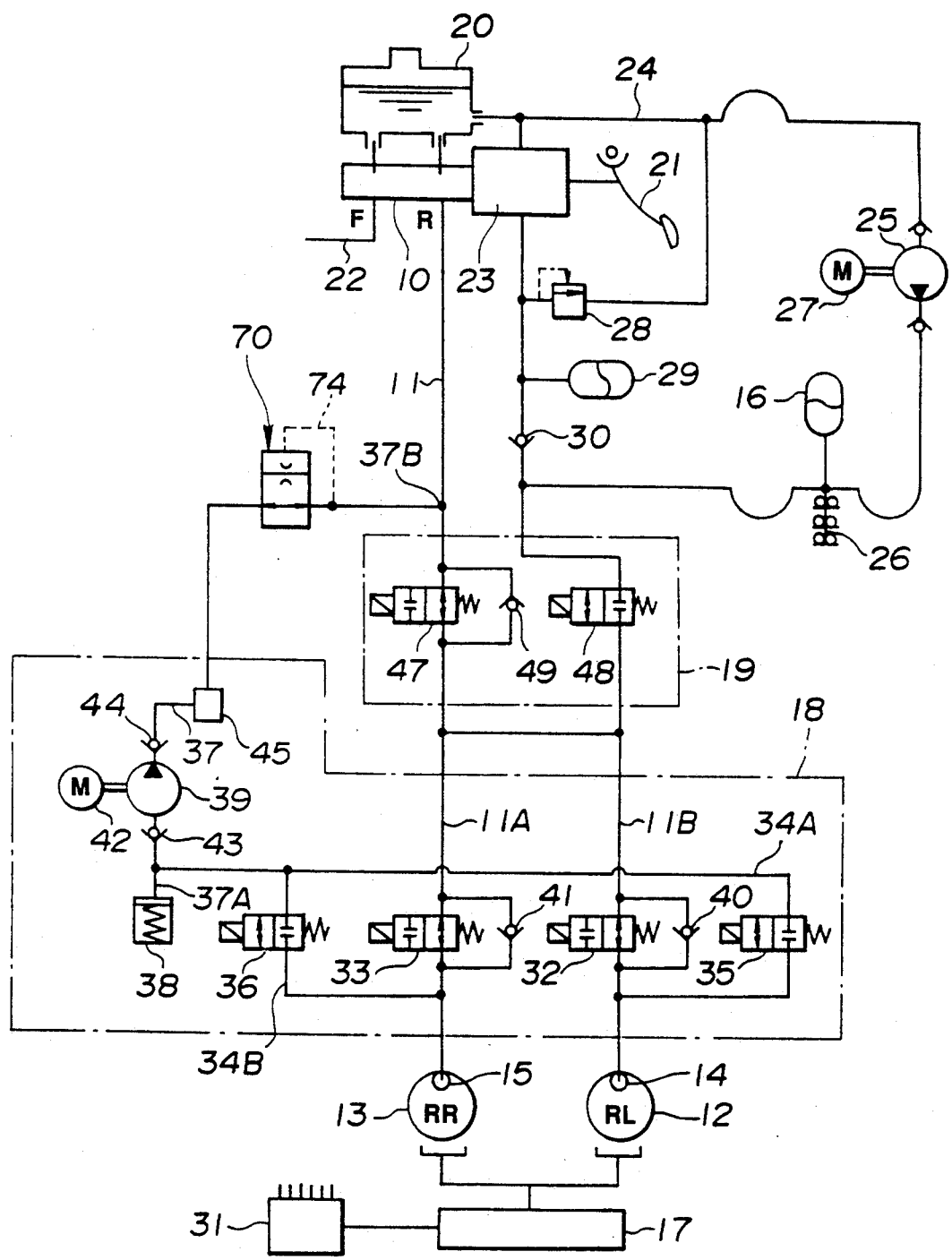
FIG. 10 is schematic block diagram of a third embodiment of the control device of the brake hydraulic pressure according to the present invention.
Figure 11:
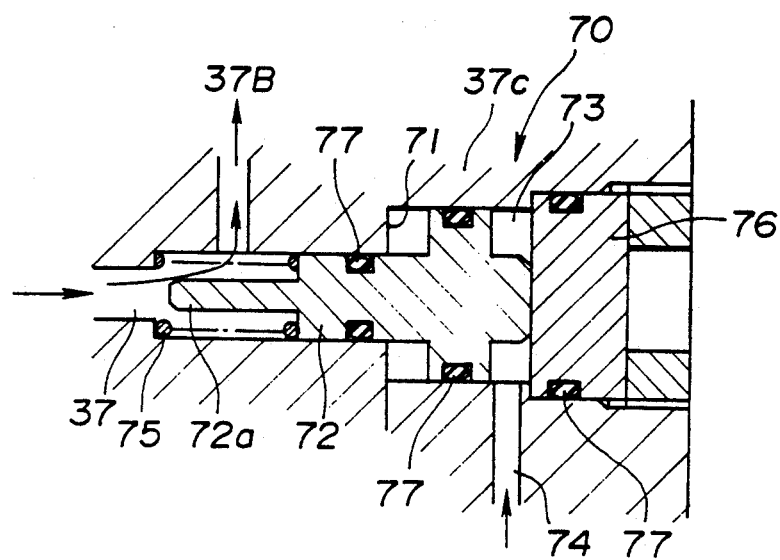
FIG. 11 is an enlarged cross-sectional view of a valve mechanism of the third embodiment of FIG. 10.
Figure 12:
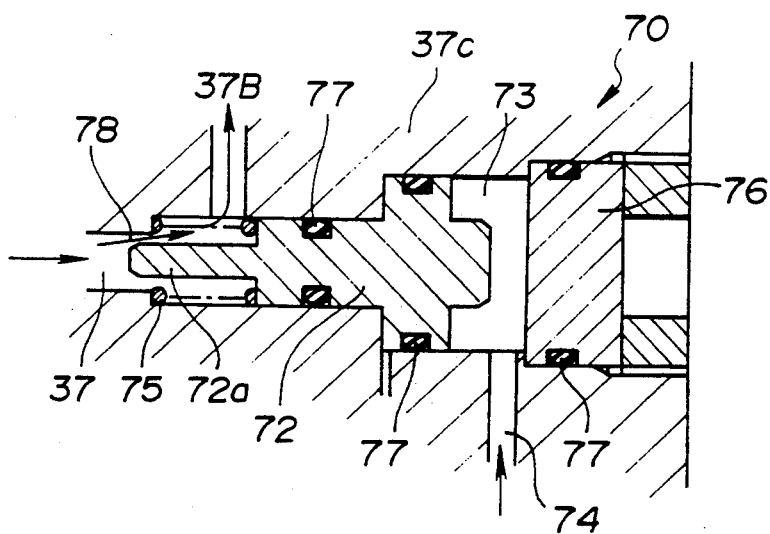
FIG. 12 is an enlarged cross-sectional view of another valve mechanism of the third embodiment of FIG. 10.

Referring to FIG. 10, there is shown a third embodiment of the apparatus for controlling a brake hydraulic pressure according the present invention. The third embodiment is similar to the second embodiment except that a flow control mechanism 70 is arranged instead of the flow control mechanism 60 so as to be operated by using a pilot pressure of the side of the first passage 11. As shown in FIGS. 11 and 12, the flow control mechanism 70 is arranged in the passage wall 37c so that an inner valve hole 71 is made in the passage wall 37c and communicated with the return passage 37. A spool 72 having a small-diameter tip end portion 72a is slidably disposed in the inner valve hole 71. A pressure chamber 73 is defined by the wall defining the inner valve hole 71 and the rear end of the spool 72 and a stopper 76. The pressure chamber 73 is communicated with the downstream end 37b of the return passage 37 through a pilot passage 74. A spring 75 is arranged in the upstream of the inner valve hole 71 to apply a biasing force to the spool 72. Seal rings 77 are attached to the spool 72 and the stopper 76 for preventing the oil leakage.

With this arrangement, during the slippage control in acceleration, the spool 72 is moved to the side of the stopper 76 by the biasing force of the spring 75 so as to be in contact with the stopper 76 since the first passage 11 is communicated with the atmosphere so as not to counter the biasing force of the spring 75. This enables to rapidly return the hydraulic fluid into the first passage 11 through the return passage 37.

On the other hand, during the anti-lock control, the hydraulic pressure in the first passage 11 is raised due to the step-down of the brake pedal 21 and the raised hydraulic pressure is applied to the pressure chamber 73 through the pilot passage 74. Accordingly, the spool 72 is moved to the side of the return passage 37 and an orifice 78 is defined by the tip end portion 72a and the return passage 37. Therefore, the hydraulic fluid fed from the return pump 39 is effectively damped in its pulsation by passing through the orifice 78.

Figure 13:
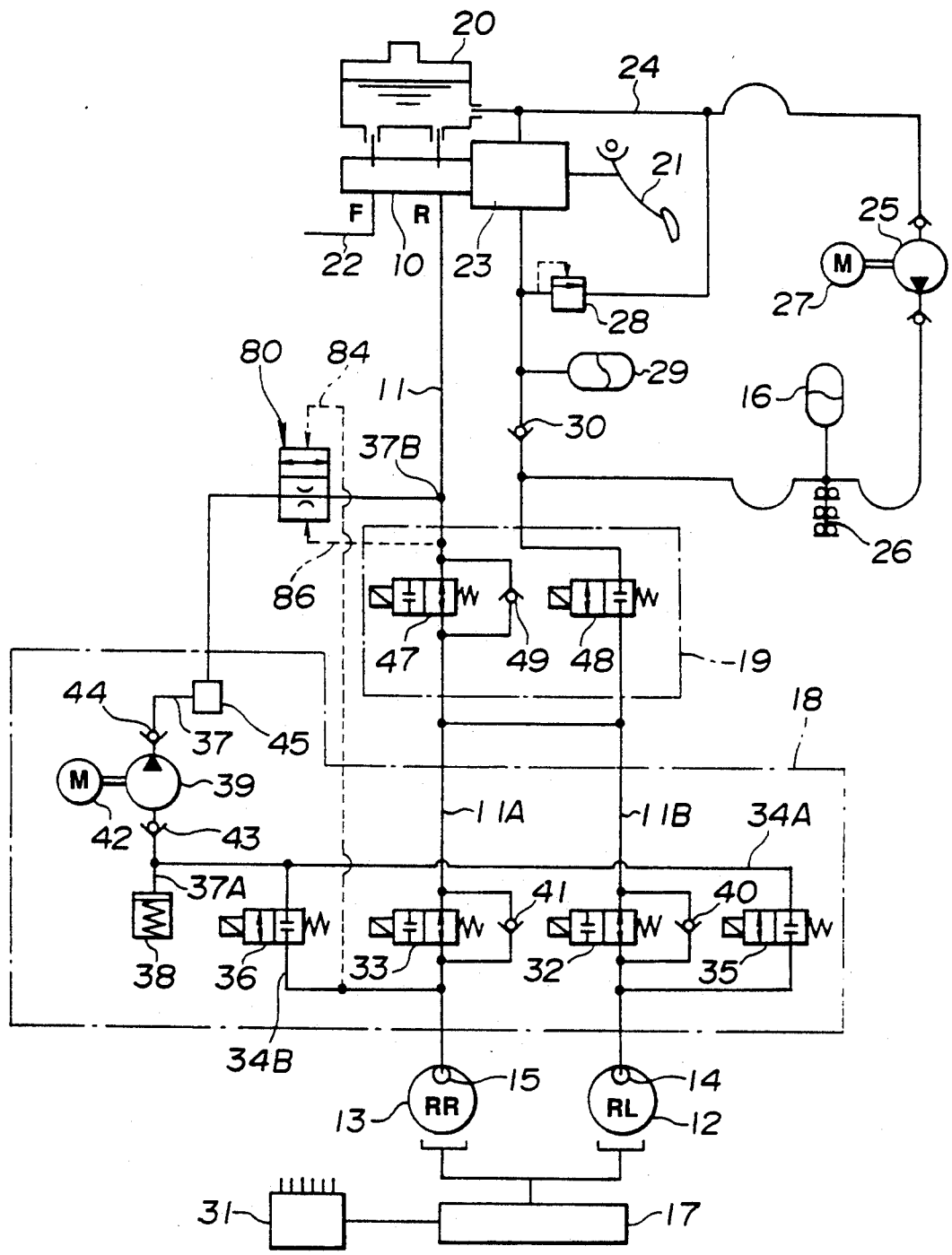
FIG. 13 is schematic block diagram of a fourth embodiment of the control device of the brake hydraulic pressure according to the present invention.
Figure 14:
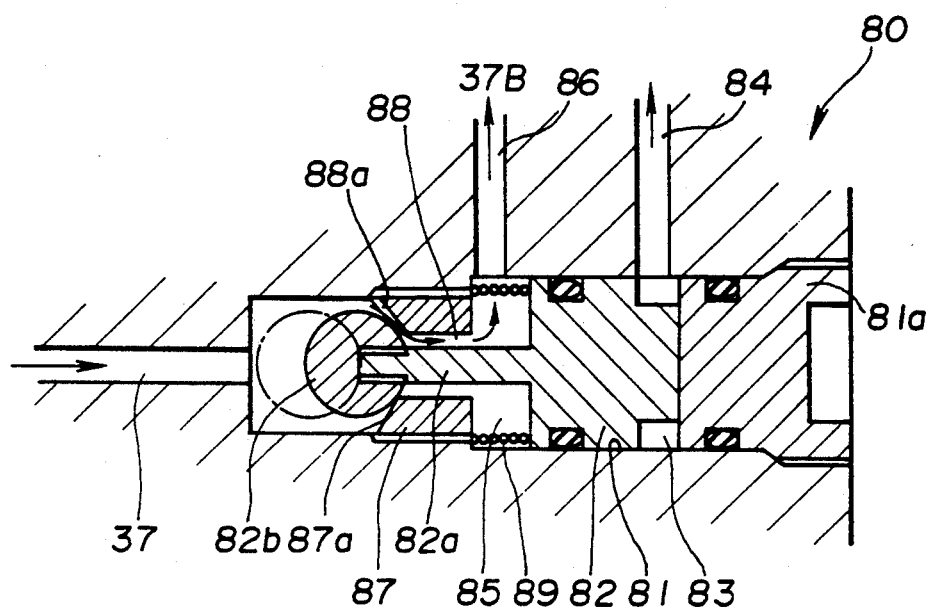
FIG. 14 is an enlarged cross-sectional view of a valve mechanism of the fourth embodiment of FIG. 13.

Referring to FIG. 13, there is shown a fourth embodiment of the control device for a brake hydraulic pressure according to the present invention. The fourth embodiment is similar to the second embodiment except that a valve mechanism 80 is disposed in the return passage 37 instead of the valve mechanism 60 and that first and second pilot passages 84 and 86 are connected to the valve mechanism 80. As shown in FIG. 14, the valve mechanism 80 is operated by the first and second pilot pressures which are fed from the drain passage 34B and the first passage 11 upstream of the first valves 47a through the first and second pilot passages 84 and 86, respectively. The first pilot pressure is fed to a first pressure chamber 83 disposed between the rear end of the spool 81 and a stopper plug 81a. The second pilot pressure is fed to the a second pressure chamber 85 disposed at a front side of the spool 82. A front shaft portion 82a of the spool 82 is fixedly connected at its tip end to a ball valve 82b which is operated to close and open the passage portion 88 by changing the distance between the ball valve 82b and a conical surface 87a of the sheet portion 87. A spring 89 is disposed in the valve hole 81 so as to apply the biasing force of the spring 89 to push the spool 82 to a close condition. An orifice 88a is made in the conical surface 87a to feed a predetermined hydraulic fluid to the first passage 11 even if the ball valve 82a is fittingly connected to the conical surface 87a.

With this arrangement, during the slippage control in acceleration, the hydraulic pressure in the first passage 11, that is, in the second pilot passage 86 is set at the atmospheric pressure, and the hydraulic pressure in the wheel cylinder 15 is set at a pressure greater than the atmospheric pressure. Accordingly, the hydraulic pressure of the wheel cylinder 15 is fed to the first pressure chamber 84 so as to function as a pilot pressure. This moves the spool 82 to the left side of FIG. 14 to open the passage portion 88 (against) the biasing force of the spring 89. Therefore, the hydraulic fluid passing through the damper chamber 45 is rapidly returned to the first passage 11 through the passage portion 88 and the second pilot passage 86.

During the anti-lock control or normal braking, since the hydraulic pressure of the first passage 11 is kept generally same as that of the wheel cylinder 15, the hydraulic pressure of the first pressure chamber 83 is the generally same as that of the second pressure chamber 85. Accordingly, the spool 82 is moved to the right side of FIG. 14 to close the passage portion 88 due to the biasing force of the spring 89. Therefore, the hydraulic fluid from the return pump 39 is fed through the orifice 88a. This damps the pulsation of the hydraulic pressure.

Figure 15:
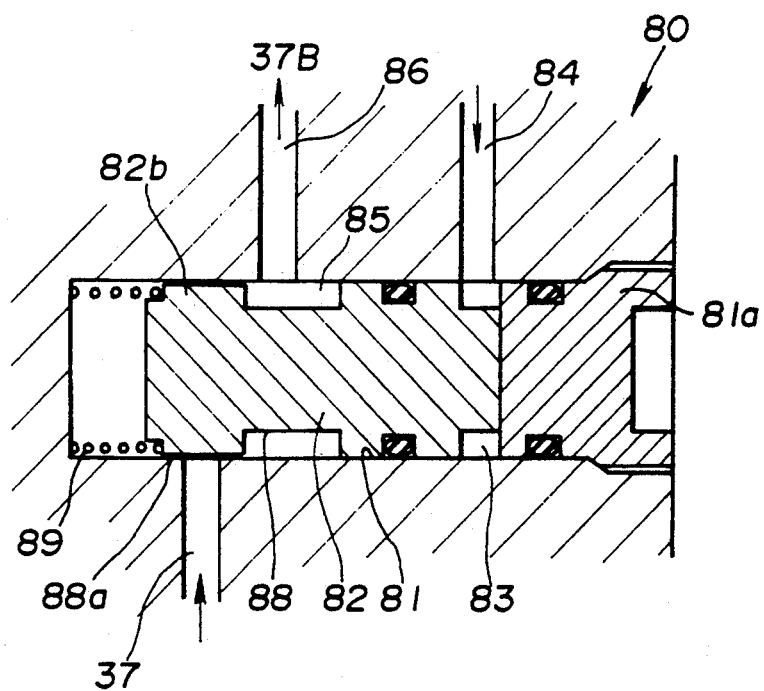
FIG. 15 is an enlarged cross-sectional view of another valve mechanism of the fourth embodiment of FIG. 13.

FIG. 15 shows a flow control mechanism similar to that of FIG. 14. The flow control mechanism 80 of FIG. 15 is arranged so that its parts are formed in a simple shape. That is to say, a generally cylindrical valve hole 81 is made and a valve portion 82b of the spool 82 of a cylindrical shape is disposed in the valve hole 81. An orifice 88a is defined between the peripheral surface of the the spool valve portion 82b and the valve hole 81. The valve portion 82b is arranged to directly close or open the return passage 37. Accordingly, the valve mechanism of FIG. 15 operates as is the same as the valve mechanism of FIG. 15 does.

Figure 16:
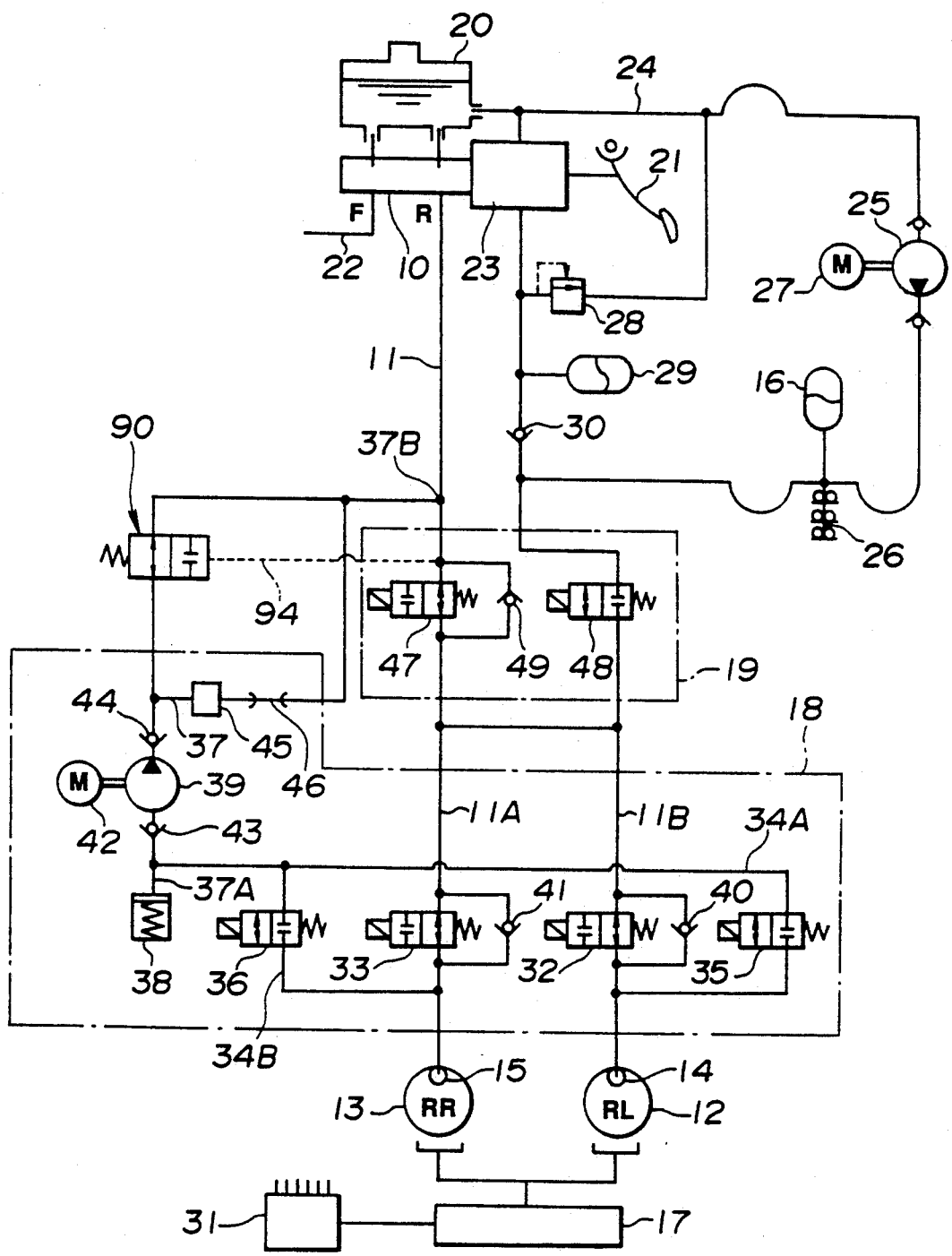
FIG. 16 is a schematic block diagram of a fifth embodiment of the control device of brake hydraulic pressure according to the present invention.
Figure 17:
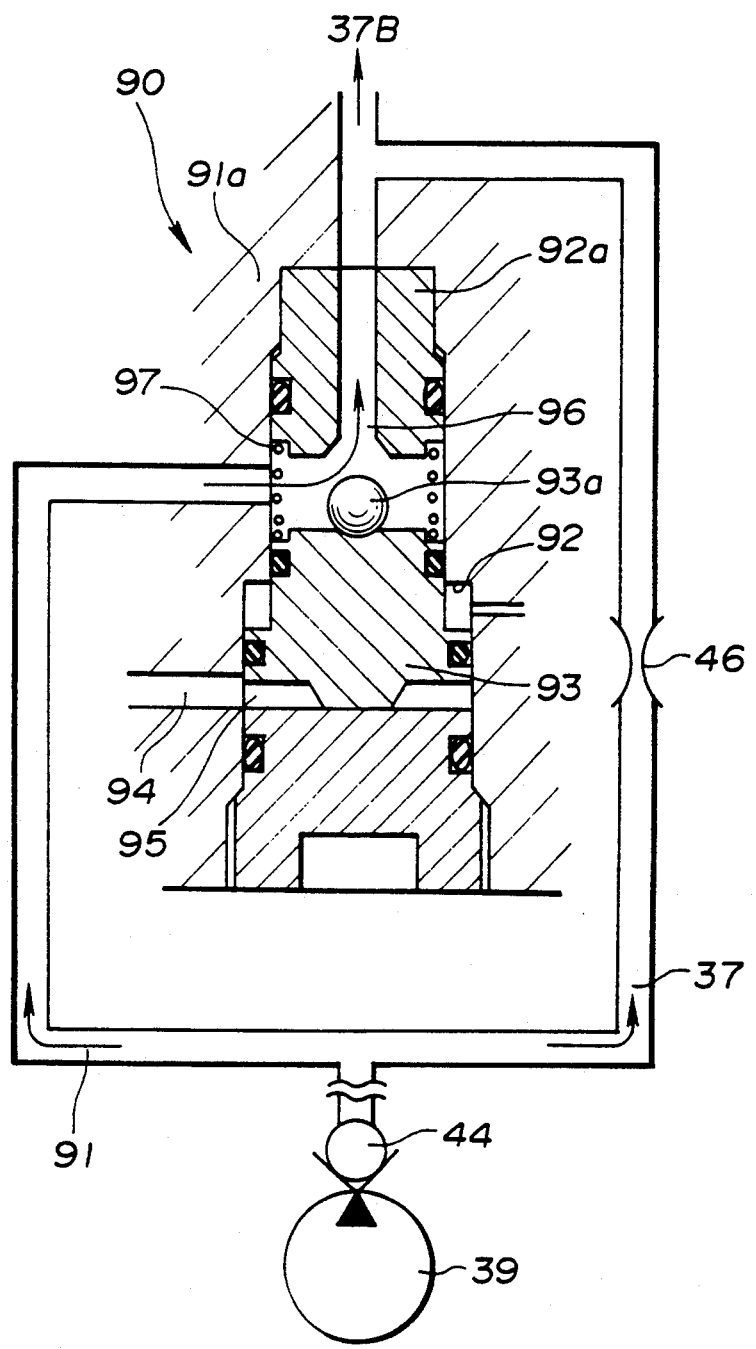
FIG. 17 is an enlarged cross-sectional view of a valve mechanism of the fifth embodiment of FIG. 16.

Referring to FIG. 16, there is shown a fifth embodiment of the control device of the brake hydraulic pressure according to the present invention. The fifth embodiment is similar to the first embodiment except that a flow control mechanism 90 is attached to be parallel with the orifice 46. As shown in FIG. 17, a sub-passage 91 is connected to the return passage 37 so as to bypass the damper chamber 45 and the orifice 45. A valve hole 92 is made in the passage wall 91a so as to be disposed on the way of the sub-passage 91. A spool 93 is slidably disposed in the valve hole 92. The spool 93 has a ball valve member 93a which is fixed to the tip end of the spool 93 so that the ball valve 93a closes and opens the passage portion 96. A spring 97 is disposed between a passage defined portion 92a and the spool 93 to bias the spool 93 to be opened. A pressure chamber 95 is defined by the spool 93, the valve hole 92 and the stopper 98, and is connected to a pilot passage 94 through which the pilot pressure from the first passage 11 upstream of the first valve 47 is fed.

With this arrangement, during the slippage control in acceleration, the hydraulic pressure in the first passage 11 functioning as a pilot pressure is set at the atmospheric pressure. Accordingly, the pressure chamber 95 is set at the atmospheric pressure, and the spool 93 is pushed by the spring 97 so as to be connected to the stopper 98. This positioning of the spool 92 allows that the hydraulic fluid from the return pump 39 flows to the first passage upstream of the first valve 47. Therefore, the hydraulic fluid from the return pump passes through the damper chamber 45 and is rapidly returned to the first passage 11 through the sub-passage 91.

During the anti-lock control or normal braking, the hydraulic fluid in the first passage 11 is pressurized and is fed to the pressure chamber 95 as a pilot pressure. This operates the spool 93 to close the passage portion 93 against the biasing force of the spring 97. Accordingly, the hydraulic fluid from the return pump 39 is fed to the first passage 11 through only the orifice 46 so as to damp the pulsation of the hydraulic pressure.

Figure 18:
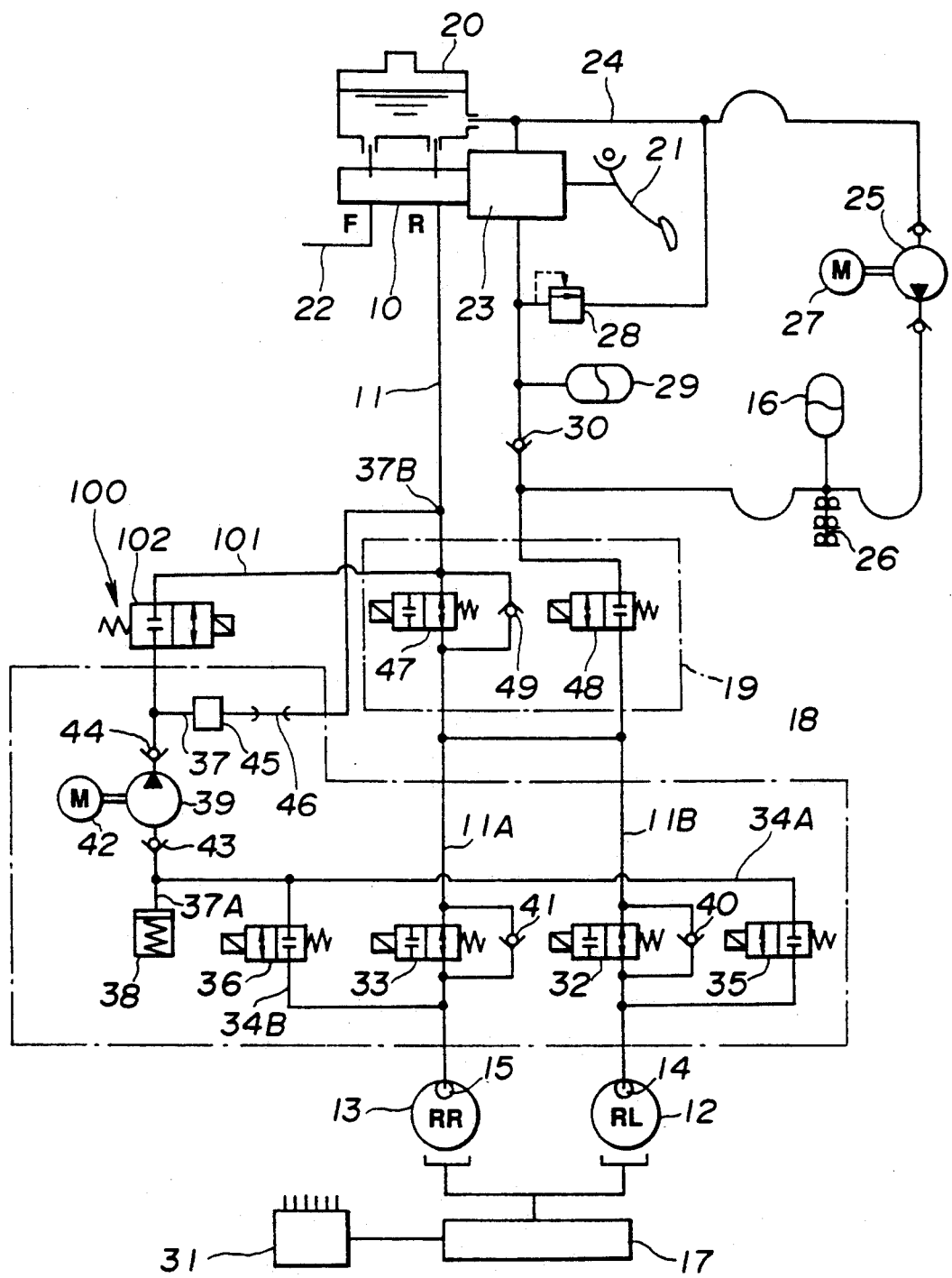
FIG. 18 is a schematic block diagram of a sixth embodiment of the control device of brake hydraulic pressure according to the present invention.

Referring to FIG. 18, there is shown a sixth embodiment of the control device of the brake hydraulic pressure according to the present invention. The sixth embodiment is similar to the first embodiment except that a flow control mechanism 100 including a solenoid valve 102. The solenoid valve is of a 2-port and 2-position type and disposed to a sub-passage 101 communicating the downstream side of the return pump 39 and the first passage 11. The solenoid valve 102 is arranged to open and close the sub-passage 101 according to the signal from the controller 31, and more particularly, to open the sub-passage 101 according to on-state commanding signal from the controller 31 during the slippage control in acceleration, and to close the subpassage 101 according to off-state commanding signal from the controller 31 during the anti-lock control or normal braking.

With this arrangement, during the slippage control in acceleration, the hydraulic fluid from the storage chamber 38 is rapidly returned to the first passage 11 through the sub-passage 101 since the solenoid valve 102 is set at an open state. Furthermore, during the anti-lock control or normal braking, the hydraulic fluid from the storage chamber 38 is returned to the first passage 11 through the orifice 46 since the solenoid valve 102 is set at a close state. Accordingly, the pulsation of the hydraulic pressure is sufficiently damped.

Figure 19:
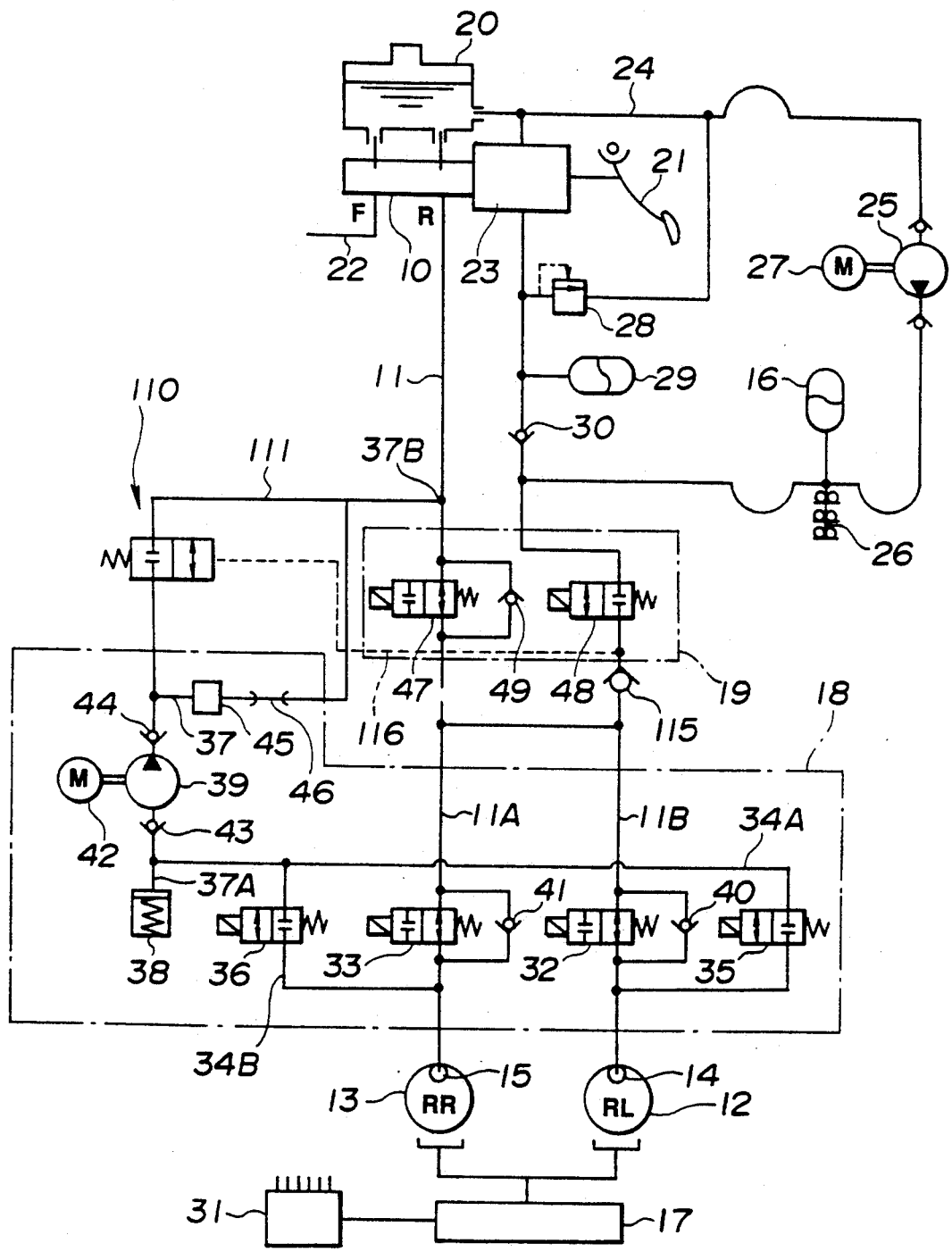
FIG. 19 is a schematic block diagram of a seventh embodiment of the control device of brake hydraulic pressure accordingly to the present invention.
Figure 20:
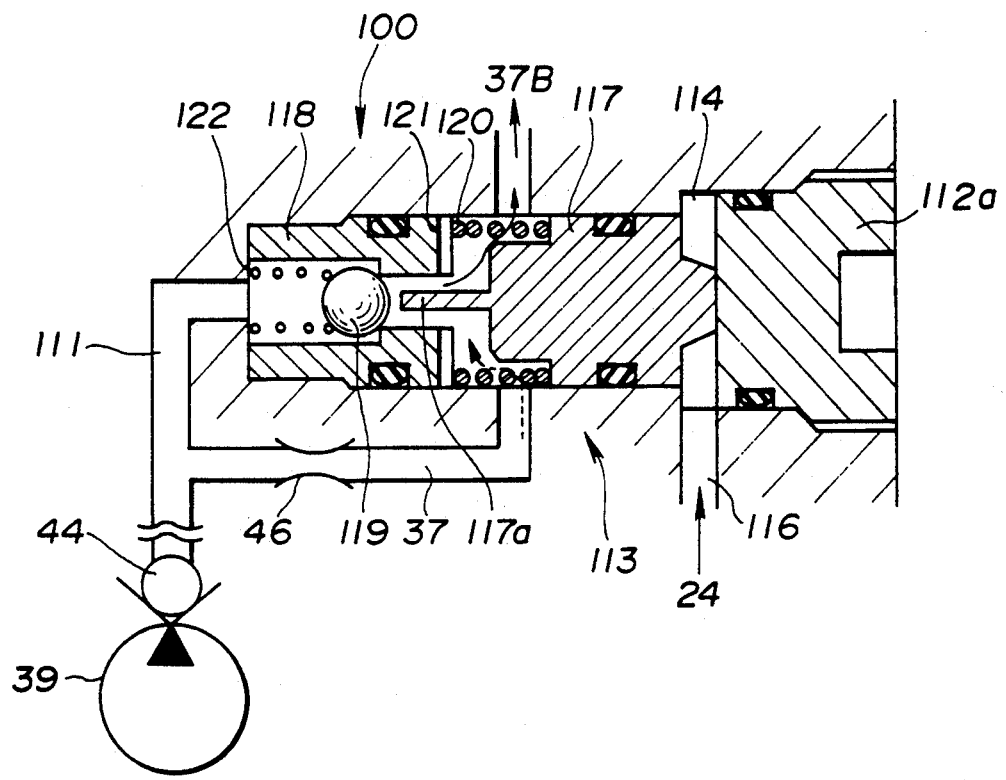
FIG. 20 is an enlarged cross-sectional view of a valve mechanism of the seventh embodiment of FIG. 19.

Referring to FIGS. 19 and 20, there is shown a seventh embodiment of the control device of the brake hydraulic pressure according to the present invention. The seventh embodiment is similar to the first embodiment except that a flow control mechanism 110 is disposed in a sub-passage 111. The flow control mechanism 110 includes a spool 113 which is slidably disposed in a valve hole 112 made in the sub-passage 111. A pressure chamber 114 for receiving a pilot pressure from the bypass passage 24 is defined between the end portion of the spool 113 and a stopper plug 112a. A check valve 115 is disposed to the bypass passage 24 downstream of the second valve 48 for regulating that the hydraulic fluid from the first passage 11 flows into the side of the second valve 48. A pilot passage 116 is disposed to communicate the pressure chamber 114 of the flow control mechanism 110 and a portion between the check valve 115 and the second valve 48. As shown in FIG. 20, the spool 113 includes a valve member 117 disposed in a valve hole 112 and a ball valve member 119 disposed in a cylinder portion 118 of the valve hole 112. The spool member 117 is located at the side of the pressure chamber 114 by being biased by a spring 120 disposed between the spool member 114 and the cylinder portion 118. Then, a tip end portion 117a of the spool member 117 is located part from the ball valve member 119. The ball valve member 119 is arranged to close the passage portion 121 due to the biasing force of a spring 122.

With this arrangement, during the slippage control in acceleration, the second valve 48 is opened in order to feed the hydraulic pressure of the accumulator 16 to the wheel cylinders 14 and 15. Since the hydraulic pressure of the bypass passage 24 is raised and fed into the pressure chamber 114 through the pilot passage 116, the spool member 117 is moved to the left side of FIG. 20 against the biasing force of the spring 120 so that the tip end portion 117 pushes the ball valve member 119. With this operation, the passage portion 121 is opened to rapidly return the hydraulic fluid passing through the return pump 39 to the the first passage 11 through the sub-passaged 111.

During the anti-lock control or normal braking control, the second valve 48 is closed and the check valve 115 prevents the hydraulic fluid in the first passage 11 from flowing into the bypass passage 24, so that the hydraulic pressure in the pressure chamber 114 is lowered. Accordingly, the spool member 117 is moved to the right side of FIG. 20 so as to be release from the ball valve member 119. The ball valve member 119 is moved to close the passage portion 120 due to the biasing force of the spring 122. Therefore, the hydraulic pressure fed from the return pump 39 is fed to the first passage 11 through the orifice 46 without passing through sub-passage 111. Accordingly, the pulsation of the hydraulic pressure is sufficiently damped by passing though the orifice 46.

Figure 21:
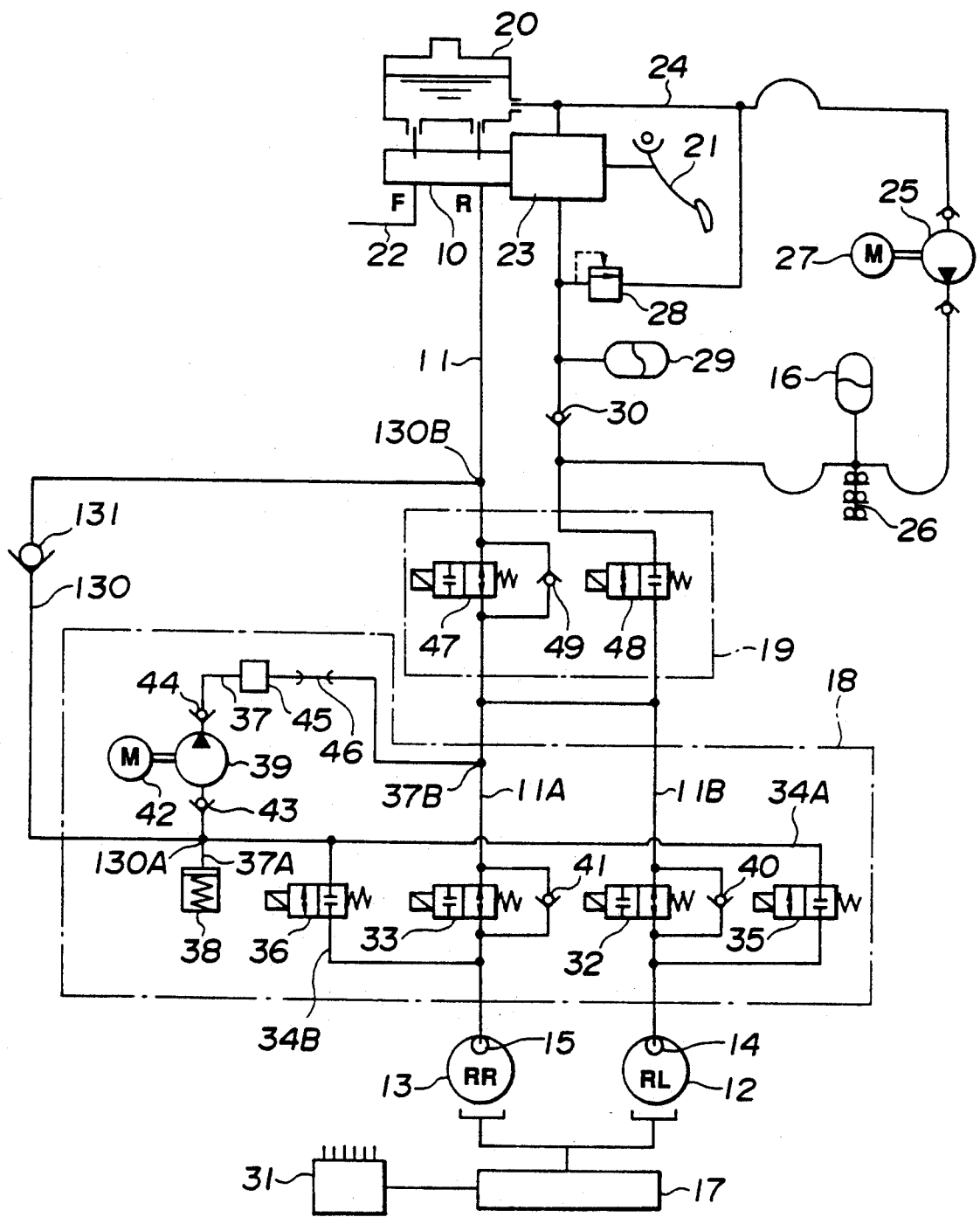
FIG. 21 is a schematic block diagram of an eighth embodiment of the control device of brake hydraulic pressure according to the present invention.

Referring to FIG. 21, there is shown an eighth embodiment of the control device of the brake hydraulic pressure according to the present invention. The eighth embodiment is similar to the first embodiment except that the downstream end 39B is connected to the first branch passage 11A between the first valve 47 and the second inlet valve 33, and a passage 130 is arranged to communicate the storage chamber 38 and the first passage upstream of the first valve 47. A check valve 131 is disposed in the passage 130 to prevent the hydraulic fluid in the first passage 11 from flowing to the storage chamber 38.

With this arrangement, during the slippage control in acceleration, the return pump 39 is stopped and the hydraulic fluid in the storage chamber 38 is flowed into the passage 130 so as to be rapidly returned to the first passage 11 through the check valve 131. That is to say, the return passage 37 generates a large pressure loss due to the flow restricting function by the one way valves 43 and 44, the return pump 39 and the orifice 46. On the other hand, the pressure loss in the passage 130 is small since only the check valve 131 is disposed in the passage 130. Accordingly, the return flow rate from the storage chamber 38 to the first passage 11 in this operation is increased to be larger than that of the previous embodiments. Therefore, the reduction of the hydraulic pressure in the wheel cylinders 14 and 15 is further rapidly carried out.

During the anti-lock control or normal braking, the pressurized hydraulic fluid in the storage chamber 38 is fed to the first branch 11a through the return passage 37, the one way valves 43 and 44, the damper chamber 45 and the orifice 46, due to the operation of the return pump 39. Herein, the pulsation of the hydraulic pressure is damped by passing through the damper chamber 45 and the orifice 46.

Figure 22:
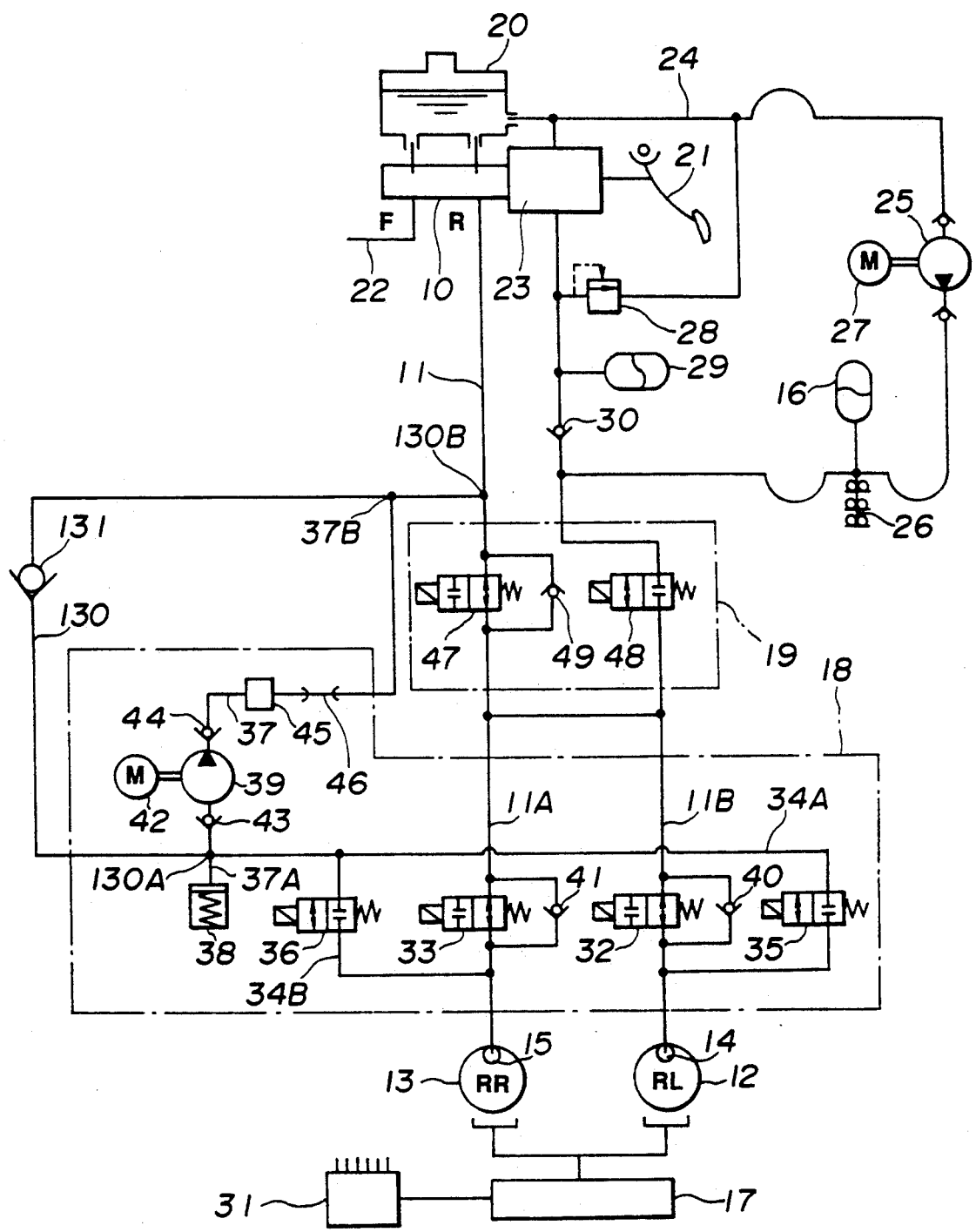
FIG. 22 is a schematic block diagram of a ninth embodiment of the control device of brake hydraulic pressure according to the present invention.

Referring to FIG. 22, there is shown a ninth embodiment of the control device of the brake hydraulic pressure according to the present invention. The ninth embodiment is similar to the eighth embodiment except that the downstream end 37b of the return passage 37 is communicated with the passage downstream side of the check valve 131 instead of the first passage 11 upstream of the first valve 47.

With this arrangement, during the anti-lock braking or normal braking, the hydraulic fluid in the storage chamber 38 is fed to the first passage 11 through the return passage 37 owing to the operation of the return pump 39.

During the slippage control in acceleration, the hydraulic fluid in the storage chamber 38 is fed to the first passage 11 mainly through the passage 130, and simultaneously, a part of the hydraulic fluid in the storage chamber 38 is fed to the first passage 11 through the return passage 37. Accordingly, the returning efficiency of the hydraulic fluid in the storage chamber 38 is further improved. Furthermore, even if the passage 130 is always closed by some troubles such as the trouble of the check valve 131, the hydraulic fluid in the storage chamber 38 is returned to the first passage 11 through the return passage 37. Accordingly, the reliability of the hydraulic circuit of this system is improved.

Although each embodiment of the present invention has been shown and described so that the hydraulic pressure control of the wheel cylinder is carried out by controlling the combined inlet and outlet valves, it will be understood that a solenoid valve of a 3-port and 3-position type may be applied instead of the combined inlet and outlet valves.

While each embodiment of the present invention has been shown and described for the case applied to a rear-wheel drive vehicle, it will be understood that the principle of the invention can be applied to a 4-wheel drive or front-wheel drive vehicle.

What is claimed is:

1. A pressure control device for a hydraulic braking system for an automotive vehicle, said pressure control device comprising:
    a first hydraulic pressure source pressurizing hydraulic fluid according to a braking action of a driver;
    a wheel cylinder through which braking force is applied to a wheel of the automotive vehicle;
    means for defining a main passage which communicates said first hydraulic pressure source and said wheel cylinder;
    a second hydraulic pressure source connected to said main passage;
    means for detecting a rotating condition of the wheel, said detecting means outputting a signal indicative of the rotating condition of the wheel;
    means for controlling hydraulic pressure of said wheel cylinder when said detecting means detecting one of a lock condition and a slippage condition;
    means for stopping the communication between said first hydraulic pressure source and said hydraulic pressure controlling means, and for opening the communication between said second hydraulic pressure source and said hydraulic pressure controlling means when said detecting means detects the slippage condition in acceleration; and
    means defining a first return passage through which said hydraulic pressure control means is communicated with said main passage at a nearer side relative to said first hydraulic pressure source than a communicating state switching means.

2. A pressure control device as claimed in claim 1 wherein said hydraulic pressure control means includes a switching valve for controlling hydraulic pressure of said wheel cylinder during one of the lock condition and the slippage condition of the wheel, a storage chamber for temporarily storing the hydraulic fluid from said wheel cylinder, and a return pump by which the hydraulic fluid in the storage chamber is fed to said main passage through said first return passage.

3. A pressure control device as claimed in claim 2, wherein a flow control mechanism is disposed in said first return passage to damp the pulsation of the hydraulic fluid passing through said first return passage.

4. A pressure control device as claimed in claim 1, wherein said first return passage is connected to said main passage between said first hydraulic pressure source and said switching means.

5. A pressure control device as claimed in claim 2, further comprising means defining a second return passage through which the storage chamber of said hydraulic pressure control means is communicated with said main passage between said first hydraulic pressure source and said switching means, said second return passage providing a one way valve which allows only that the hydraulic fluid of the storage chamber flows to said main passage.

6. A pressure control device as claimed in claim 5, wherein said first return passage is connected to said second return passage between the one way valve and said main passage.

7. A pressure control device for a hydraulic braking system for an automotive vehicle, said pressure control device comprising:
    a first hydraulic pressure source pressurizing hydraulic fluid according to a braking action of a driver;
    a wheel cylinder through which braking force is applied to a wheel of the automotive vehicle;
    means for defining a main passage which communicates said first hydraulic pressure source and said wheel cylinder;
    a second hydraulic pressure source connected to said main passage;
    a wheel rotating condition detector detecting a rotating condition of the wheel and outputting a signal indicative of the rotating condition of the wheel;
    a wheel-cylinder pressure control device controlling hydraulic pressure of said wheel cylinder when said wheel rotating condition detector detecting one of a lock condition and a slippage condition;
    a switching device stopping the communication between said first hydraulic pressure source and said wheel-cylinder pressure control device and opening the communication between said second hydraulic pressure source and said wheel-cylinder pressure control device when said wheel rotating condition detector detects the slippage condition in acceleration; and
    means defining a first return passage through which said hydraulic pressure controlling device is communicated with said main passage, said first return passage returning hydraulic fluid in said wheel-cylinder pressure control device to said main passage during the slippage control in acceleration.

* * * * *